June 1, 1937. C. B. JOHNSON 2,082,631
VISOR CONSTRUCTION
Filed Oct. 12, 1934
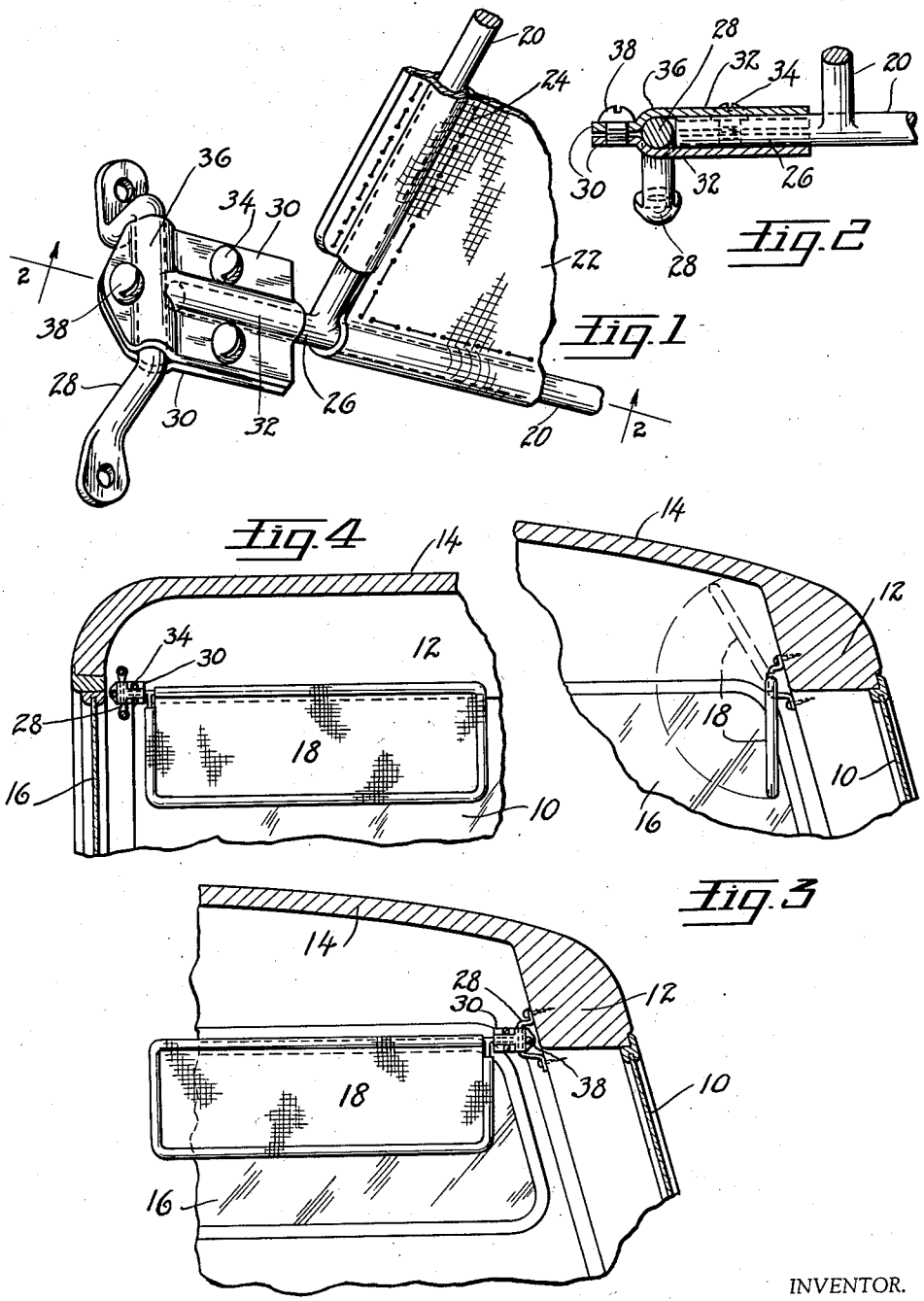
INVENTOR.
Charles Bayard Johnson
BY
Parker & Burton
ATTORNEYS.

Patented June 1, 1937

2,082,631

UNITED STATES PATENT OFFICE 2,082,631

VISOR CONSTRUCTION

Charles Bayard Johnson, Monroe, Mich., assignor to Woodall Industries Incorporated, Detroit, Mich., a corporation of Michigan Application October 12, 1934, Serial No. 748,045

7 Claims. (Cl. 296—97)

My invention relates to improvements in sun visor construction adapted for use in the interior of an automobile body and particularly to an improved mounting adapted to support the visor at a multiplicity of positions and so that the visor may be used to obstruct the light of the sun through the windshield or through a side window of the body.

An object is the provision of the visor having an improved mounting which is of simple, rugged and efficient construction and inexpensive to manufacture and install and which comprises a minimum number of parts.

A further object is the provision of a mounting of the character described which permits the visor being moved from a point above the windshield to a multiplicity of obstructing positions overlying the windshield and also to be moved to a multiplicity of obstructing positions overlying a side window pane.

Another object is the provision of a visor having a pivot member extending from an upper corner and a mounting comprising a bracket having a pivot portion and clamping mechanism held in engagement with the pivot portion of the bracket and the pivot member of the visor adapted to resistingly permit adjustment of the visor by rotation about its own pivot member to overlie the windshield and adjustment of the visor about the pivot point of the bracket to overlie a side window of the vehicle within which a visor is installed.

A further object is the provision of a visor having a frame provided with an extending pivot portion and a mounting therefor including a bracket having a pivot portion and a pair of clamping plates securing the visor to the bracket. A characteristic is that the clamping plates are so held in engagement with the pivot portion of the bracket that the visor may be swung thereabout to a position overlying a side window or to a position overlying the windshield and will maintain the position to which it has been swung. A further characteristic is that these clamping plates are also held grippingly against the pivot portion of the visor frame in such a manner that the visor may be swung about said pivot portion to be moved from a position overlying the windshield to a position of non use superimposing the windshield.

The above objects and others will more fully appear from the following description, appended claims, and accompanying drawing, wherein:

Fig. 1 is a perspective of my improved mounting coupled with the visor,

Fig. 2 is a sectional view taken on the line 2—2 of Fig. 1,

Fig. 3 is an end view of the visor in place in the vehicle body,

Fig. 4 is an elevation of the visor in place in the vehicle body overlying the windshield, and Fig. 5 is an elevation of the visor in place in the vehicle body overlying the side window.

My invention is embodied in a visor which is used in the interior of a vehicle body and is generally supported above the windshield therein. In the drawing the windshield is indicated as 10, the header surmounting the windshield as 12, the roof as 14, and the side window as 16. The visor is indicated in assembly as 18 and comprises a frame 20, formed of wire or other suitable material, which carries an opaque panel 22 formed of composition fiber board, artificial leather or the like, stitched as at 24 or otherwise secured to the frame.

The frame is provided with a portion 26 extending from an upper corner and adapted to serve as a pivot mounting for the visor. The visor is supported, as shown in the drawing, upon the header which superimposes the windshield by a suitable bracket 28, which bracket may be secured by screws or the like to the header. The header extends angularly with respect to the vertical and the bracket may be shaped as shown so that its intermediate portion which serves as a pivot mounting is disposed substantially in the perpendicular position as appears in Figs. 3 and 5.

I provide clamping mechanism in the form of a pair of cooperating clamping plates 30. These plates have complementary deformed portions 32 which are adapted to correspondingly engage the pivot portion 26 of the visor and are held frictionally thereagainst by screws 34 or the like. The plates are so held against the pivot portion 26 of the visor that it can be rotated therebetween against frictional resistance of the plates and will retain the visor at any angular position to which it may be adjusted by virtue of such rotation. Any suitable conventional securing means such as the screws 34 can of course be employed and if desired a spring tension can readily be placed on the plates in a manner well known to the art through employing springs in connection with the tightening means.

The plates 30 are further provided with portions 36 which are adapted to engage about the pivot portion of the bracket 28 as shown in the figures of the drawing and particularly in Figs. 1 and 2 to be held frictionally thereagainst through the employment of a screw 38 or other tightening device causing the plates to snugly grip the bracket so that while pivotal movement is permitted the frictional resistance is such that the visor will be held at any position to which it may be adjusted as a result of such pivotal movement. The screw 38 extends through the projecting end portion of the plates which are of such a dimension as to swing within the bracket itself and between the bracket and the header as shown in Fig. 5.

It is apparent that the visor may be positioned as shown in dotted outline in Fig. 3 or as shown in solid line in Fig. 3. At the position shown in dotted outline it is out of the way. In the position shown in solid line in such figure it overlies the windshield. These positions arise when the visor is swung about its pivot 26.

When it is desired to use the visor as a shield for the side window it may be swung from the position shown in solid line in Fig. 3 to the position shown in Fig. 5.

What I claim is:

1. Visor supporting mechanism comprising, in combination with a visor panel having a projecting horizontal pivot portion and a fixed bracket having a vertical pivotal portion, a pair of clamping plates provided with complementary T-shaped grooves adapted to receive the pivot portion of the visor panel and the pivot portion of the fixed bracket with said pivot portions disposed normal to each other, and means holding said plates clamped against said pivot portions to permit resisted rotation of said pivot portions each within its grooves while maintaining frictional engagement of the plates upon said pivot portions to maintain the plates at any angular position of adjustment to which they may be swung with respect to either pivot portion.

2. Visor supporting mechanism comprising, in combination with a visor having a pivot and a bracket having a pivot, a pair of clamping plates having complementary T-shaped grooves, the bracket pivot being received within the head of the T-shaped grooves and the visor panel pivot being received within the upright portion of the T-shaped grooves, and means securing said clamping plates together on opposite sides of the upright portion of the T-shaped grooves and a part securing said clamping plates together on the opposite side of the head of the T-shaped grooves.

3. Visor supporting mechanism comprising, in combination with a visor panel having an extension forming a pivot portion and a fixed bracket having a pivot portion extending perpendicularly to the pivot portion on the visor, a pair of clamping plates provided with complementary grooves adapted to receive the pivot portion of the visor panel and the pivot portion of the fixed bracket, the groove formed by said plates for receiving the pivot portion of the visor extending normal to and opening into the groove formed by said plates for receiving the pivot portion of the fixed bracket, and means holding said plates frictionally clamped against said pivot portions permitting resisted rotation of said visor pivot portion relative to said plates and said plates relative to said bracket pivot portion.

4. Visor supporting mechanism comprising, in combination with a visor panel having an extension forming a pivot portion and a fixed bracket having a pivot portion extending perpendicularly to the pivot portion on the visor, a pair of clamping plates having complementary grooves to receive the pivot portion of the visor panel and the pivot portion of the fixed bracket, said grooves opening into one another, and means holding said plates frictionally clamped against said pivot portions permitting resisted rotation of said visor pivot portion relative to said plates and said plates relative to said bracket pivot portion.

5. Mechanism of the class described including in combination a visor having a pivot, a bracket having a pivot, a pair of clamping plates having complementary intersecting grooves, the bracket pivot and visor pivot being received, respectively, within said grooves, and adjustable clamping means positioned on each side of each of said grooves, each cooperating with said plates to draw the same together.

6. Mechanism of the class described including in combination a visor having a pivot, a bracket having a pivot, a pair of clamping plates each having a pair of complementary grooves, one groove starting at one side of the other groove, said other groove overlapping the starting end of the one groove, said bracket pivot and visor pivot being received, respectively, within said grooves, and adjustable clamping means positioned on each side of each of said grooves, each cooperating with said plates to draw the same together.

7. Mechanism of the class described including in combination a visor having a pivot, a bracket having a pivot, a pair of clamping plates each having a pair of complementary grooves, one groove extending from one side of the plates to the opposite side thereof, the other groove starting at one side of said first mentioned groove and extending angularly thereto, said bracket pivot and visor pivot being received, respectively, within said grooves, and adjustable clamping means positioned on each side of each of said grooves.

CHARLES BAYARD JOHNSON.